(12) United States Patent
Kanai et al.

(10) Patent No.: US 10,158,785 B2
(45) Date of Patent: Dec. 18, 2018

(54) INFORMATION PROCESSING APPARATUS, METHOD FOR CALLING INPUT PORTION, AND COMPUTER-READABLE STORAGE MEDIUM FOR COMPUTER PROGRAM

(71) Applicant: Konica Minolta, Inc., Tokyo (JP)

(72) Inventors: Kazuaki Kanai, Toyokawa (JP); Masayuki Ito, Nagoya (JP); Kazuhiro Tomiyasu, Toyokawa (JP); Hiroki Ueda, Toyohashi (JP); Yukina Hisada, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/990,385

(22) Filed: Jan. 7, 2016

(65) Prior Publication Data

US 2016/0205286 A1    Jul. 14, 2016

(30) Foreign Application Priority Data

Jan. 8, 2015  (JP) .................................. 2015-002280

(51) Int. Cl.
*G06F 15/00* (2006.01)
*H04N 1/44* (2006.01)
(Continued)

(52) U.S. Cl.
CPC ........... *H04N 1/4413* (2013.01); *G06F 3/017* (2013.01); *G06F 3/0484* (2013.01);
(Continued)

(58) Field of Classification Search
CPC ............. H04N 1/4413; H04N 1/00204; H04N 1/00307; H04N 2201/0094;
(Continued)

(56) References Cited

U.S. PATENT DOCUMENTS

2011/0179466 A1*  7/2011  Hamada ............. H04N 1/00464
                                                                 726/3
2012/0159618 A1*  6/2012  Ohba ..................... G06F 21/608
                                                                 726/19
(Continued)

FOREIGN PATENT DOCUMENTS

CN          100401253 C        3/2007
CN          102087579 A        6/2011
(Continued)

OTHER PUBLICATIONS

Japan Patent Application No. 2015-002280; Office Action; dated Feb. 14, 2017; 10 pages.
(Continued)

*Primary Examiner* — Saeid Ebrahimi Dehkord
(74) *Attorney, Agent, or Firm* — Baker Hostetler

(57) ABSTRACT

An information processing apparatus includes an input portion for a user to enter information, the input portion including a first input portion, and a second input portion with which information being entered is hard to be seen by a person around the user as compared with the first input portion. The information processing apparatus also includes a determination portion configured to determine whether or not entry target information to be entered by the user is sensitive. The information processing apparatus further includes a call portion configured to, prior to entry of the entry target information, call the first input portion when the determination portion determines that the entry target information is not sensitive, and call the second input portion when the determination portion determines that the entry target information is sensitive.

18 Claims, 17 Drawing Sheets

(51) Int. Cl.
    *G06F 3/0484*     (2013.01)
    *G06F 3/12*     (2006.01)
    *H04N 1/00*     (2006.01)
    *G06F 3/0488*     (2013.01)
    *G06F 3/01*     (2006.01)
    *G06F 21/31*     (2013.01)
    *G06F 21/36*     (2013.01)

(52) U.S. Cl.
    CPC ........ *G06F 3/0488* (2013.01); *G06F 3/04842* (2013.01); *G06F 3/1205* (2013.01); *G06F 3/1222* (2013.01); *G06F 3/1238* (2013.01); *G06F 3/1292* (2013.01); *G06F 21/31* (2013.01); *G06F 21/36* (2013.01); *H04N 1/00204* (2013.01); *H04N 1/00307* (2013.01); *H04N 2201/0094* (2013.01)

(58) Field of Classification Search
    CPC .. G06F 3/04842; G06F 3/1205; G06F 3/1238; G06F 3/1292
    USPC ........................................................ 358/1.14
    See application file for complete search history.

(56) References Cited

U.S. PATENT DOCUMENTS

2013/0176208 A1     7/2013     Tanaka et al.
2014/0101772 A1     4/2014     Anzai
2014/0380462 A1*     12/2014     Hosoda ................... G06F 21/31 726/17

FOREIGN PATENT DOCUMENTS

| | | |
|---|---|---|
| JP | 2003-348224 A | 12/2003 |
| JP | 2007-079852 A | 3/2007 |
| JP | 2011-118584 A | 6/2011 |
| JP | 2012-063921 A | 3/2012 |
| JP | 2013-140540 A | 7/2013 |
| JP | 2014-075096 A | 4/2014 |
| JP | 2014075096 A | 4/2014 |
| JP | 2014-137671 A | 7/2014 |

OTHER PUBLICATIONS

Japan Patent Application No. 2015-002280; Office Action; dated Aug. 22, 2017; 8 pages.
Chinese Official Communication dated Apr. 10, 2018 for corresponding Chinese patent application No. 201610012218.8 and partial English translation.
Japan Patent Application No. 2015-002280; Reconsideration by Examiner before Appeal; dated Dec. 25, 2017; 8 pages.
Japanese Official Communication dated Jun. 26, 2018 for corresponding Japanese patent application No. 2015-002280 and its partial English translation.

\* cited by examiner

| SCREEN CODE | OBJECT CODE |
|---|---|
| G001 | B002 |
|  | B005 |
| G002 | B010 |
| G004 | B003 |
|  | B006 |
|  | B007 |
| ⋮ | ⋮ |

FIG. 14

| SCREEN CODE | OBJECT CODE | SOUND INPUT MODULE | FULL KEYBOARD MODULE | NUMERIC KEYBOARD MODULE | HANDWRITING INPUT MODULE |
|---|---|---|---|---|---|
| G001 | B001 | ONCE | | | |
| | B002 | | THREE TIMES | | |
| | B003 | TWICE | FIVE TIMES | TWICE | |
| | B004 | | | THREE TIMES | |
| | B005 | ... | ... | ... | ... |
| ... | | | | | |

INFORMATION PROCESSING APPARATUS, METHOD FOR CALLING INPUT PORTION, AND COMPUTER-READABLE STORAGE MEDIUM FOR COMPUTER PROGRAM

CROSS-REFERENCE TO RELATED APPLICATIONS

This application claims the benefit of and priority to Japanese patent application No. 2015-002280, filed on Jan. 8, 2015, the contents of which are hereby incorporated by reference.

BACKGROUND

1. Field of the Invention

The present invention relates to a use of a plurality of input portions in an information processing apparatus.

2. Description of the Related Art

A variety of input devices for a user to input information to a device comes into widespread use. Such input devices are, for example, a keyboard, a touch-sensitive panel display, and a mouse.

Different forms of on-screen keyboard (refer to FIGS. 4 and 5), e.g., a full keyboard and a numeric keyboard can be displayed on a touch-sensitive panel display. Such an on-screen keyboard is generally called a "software keyboard" or "virtual keyboard". The user inputs a sign (letter, numeral, or mark) by touching a key, of the on-screen keyboard, corresponding to the sign.

The user may also input a sign by writing the same on a display surface of the touch-sensitive panel display with finger or pen (refer to FIG. 6). Such an input method is generally called "handwriting input".

As described above, different types of input means are implemented by combining input devices with a variety of screens.

Further, an input means is widely used which converts a word spoken by a user into a sign based on a signal of sound picked up by a microphone.

Further, as an input system by means of a touch-sensitive panel display, the following system has been proposed.

A remote access control system includes a connection source terminal having a touch panel type input/output section to be operated by user's hands and a connection destination terminal to be accessed from the connection source terminal through a communication network. The connection destination terminal includes an application monitoring section for notifying the connection source terminal of a type or an item of an application focused by remote operation, and the connection source terminal includes a virtual keyboard display section for determining a keyboard type corresponding to the application or the item notified from the connection destination terminal and displaying a suitable virtual keyboard on a touch panel (Japanese Laid-open Patent Publication No. 2014-137671).

A portable telephone set has been proposed which includes a display part provided with a back light, and a control part. The control part controls the display part to display a screen having a password input field into which a password is entered. When the password input field is selected, the control part sends a control signal for turning off the back light to the display part (Japanese Laid-open Patent Publication No. 2003-348224).

According to the conventional technologies, a user arbitrarily selects an input means according to his/her preference from among a plurality of input means and uses the selected input means. Alternatively, the user presets, as a default input means, his/her favorite input means in a device. This enables the user to use the default input means promptly when the need for input operation arises.

In some cases, however, the default input means is not preferable to input sensitive information (such as confidential information).

SUMMARY

The present disclosure has been achieved in light of such an issue, and therefore, an object of an embodiment of the present invention is to input sensitive information more securely than is conventionally possible.

An information processing apparatus according to an aspect of the present invention is an information processing apparatus including an input portion for a user to enter information, the input portion including a first input portion, and a second input portion with which information being entered is hard to be seen by a person around the user as compared with the first input portion; a determination portion configured to determine whether or not entry target information to be entered by the user is sensitive; and a call portion configured to, prior to entry of the entry target information, call the first input portion when the determination portion determines that the entry target information is not sensitive, and call the second input portion when the determination portion determines that the entry target information is sensitive.

An information processing apparatus according to another aspect of the present invention is an information processing apparatus including a plurality of input portions for a user to enter information; a counting portion configured to count a number of times at which each of the input portions is used to enter specific item information; and a call portion configured to, prior to entry of the specific item information, call, among the input portions, an input portion having a largest number of times instead of a default input portion.

These and other characteristics and objects of the present invention will become more apparent by the following descriptions of preferred embodiments with reference to drawings.

BRIEF DESCRIPTION OF THE DRAWINGS

FIG. 7 is a diagram showing an example of a screen code and an object code stored in a sensitive object storing portion.

FIG. 14 is a diagram showing an example of a table in which the number of switching times is stored for each text box.

DETAILED DESCRIPTION

[First Embodiment]

Figure 1:
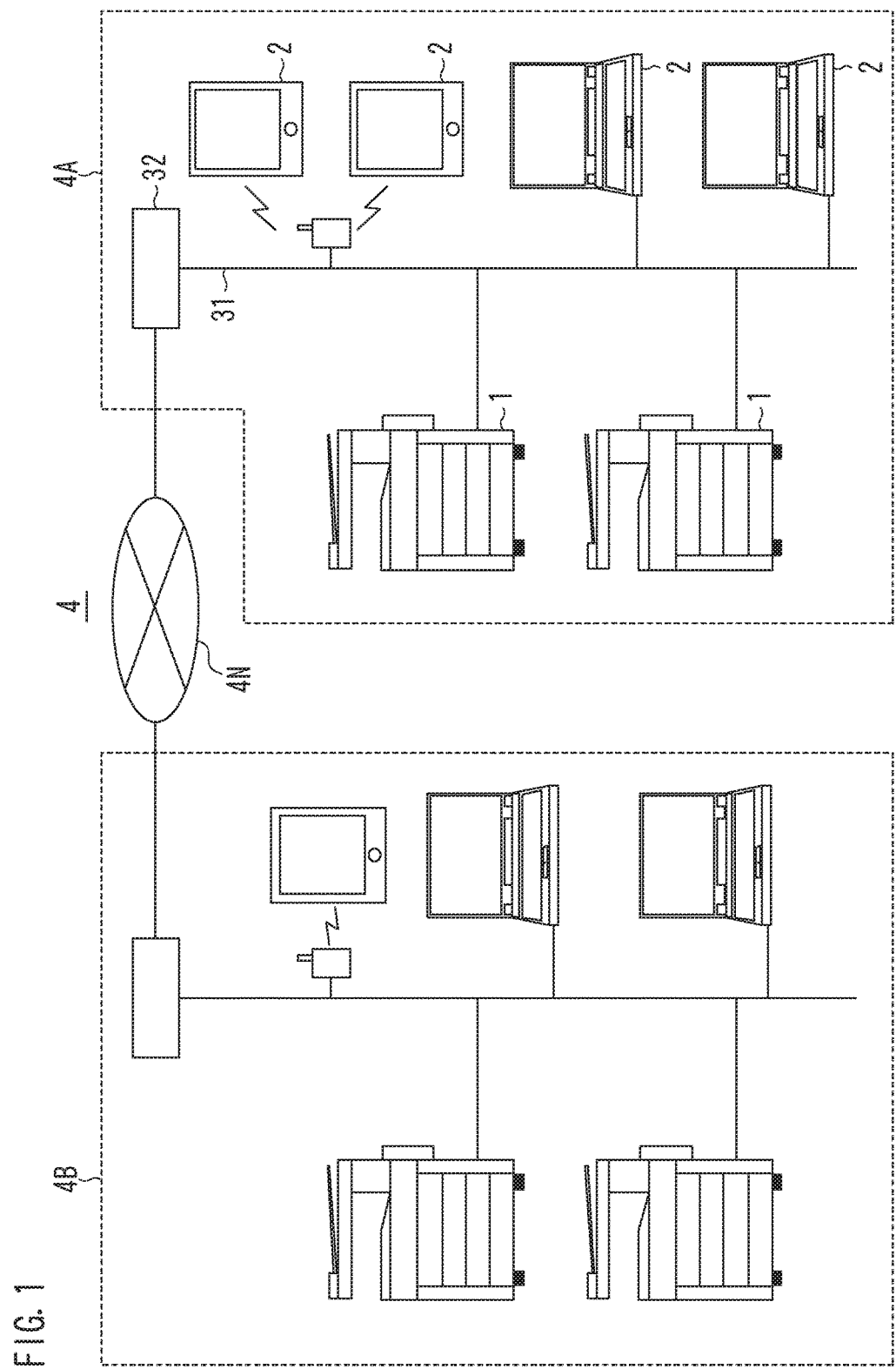
FIG. 1 is a diagram showing an example of the overall configuration of a network system.
Figure 2:
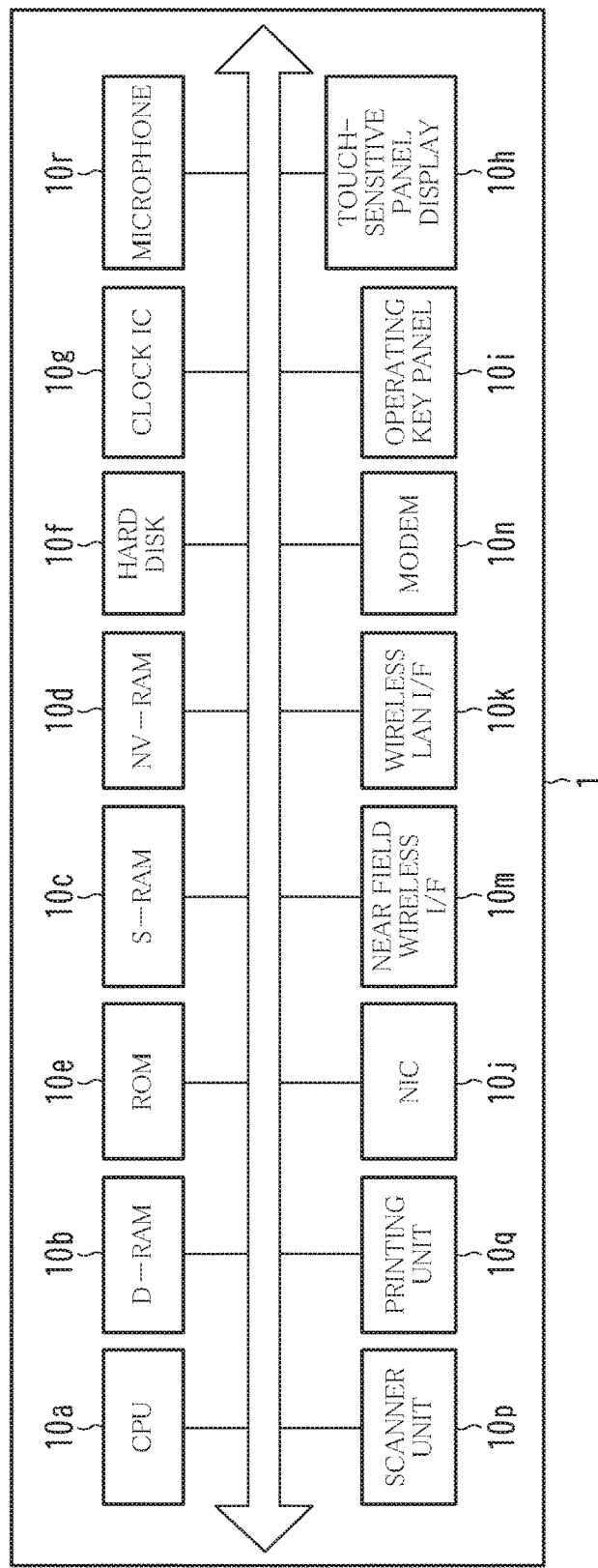
FIG. 2 is a diagram showing an example of the hardware configuration of an image forming apparatus.
Figure 3:
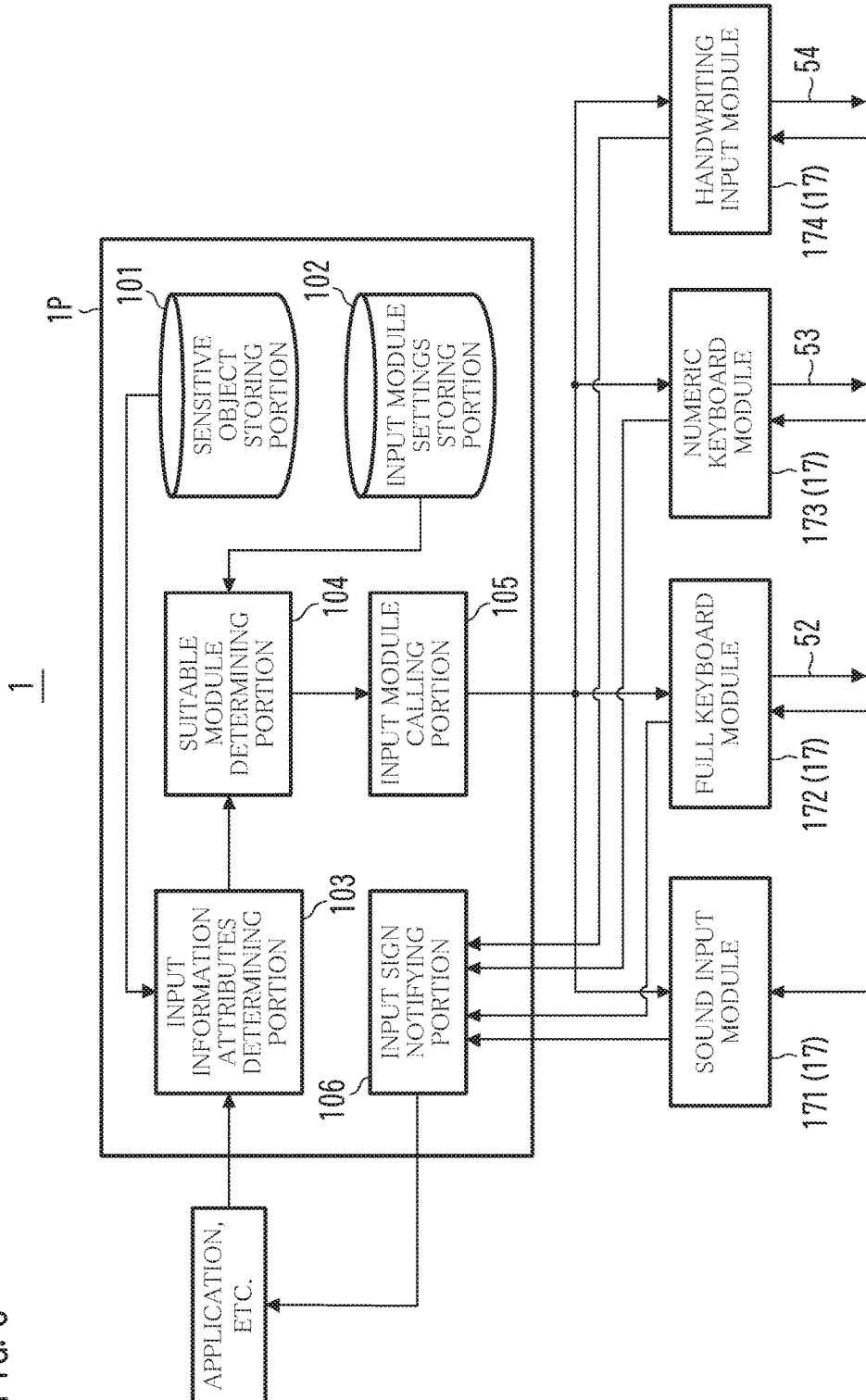
FIG. 3 is a diagram showing an example of the functional configuration of an image forming apparatus.
Figure 4:
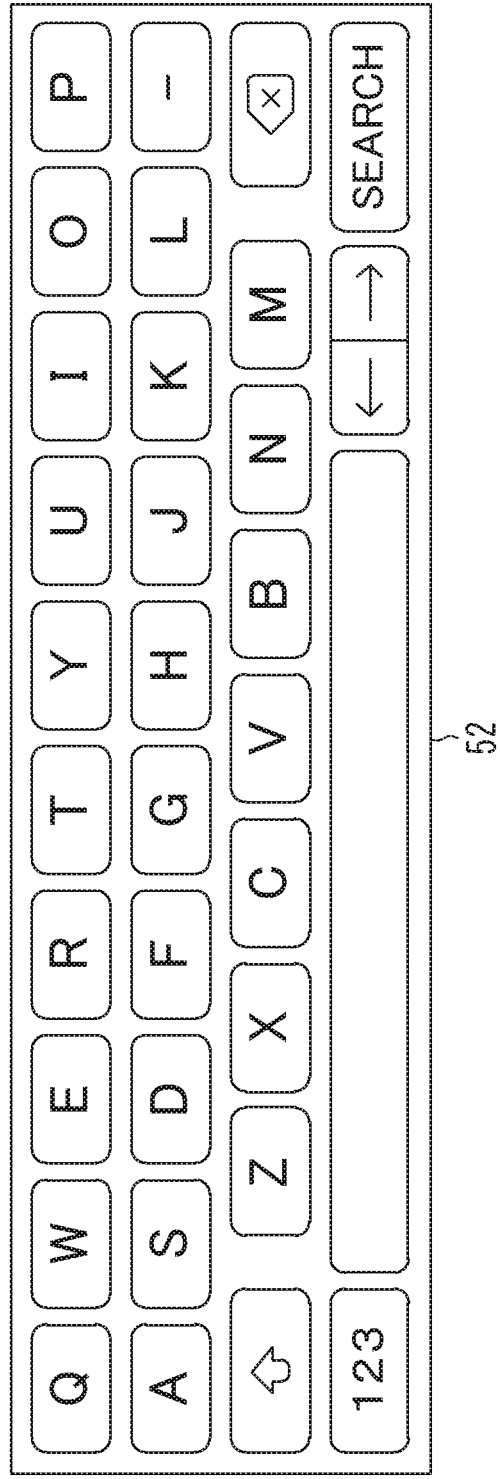
FIG. 4 is a diagram showing an example of a full keyboard screen.
Figure 5:
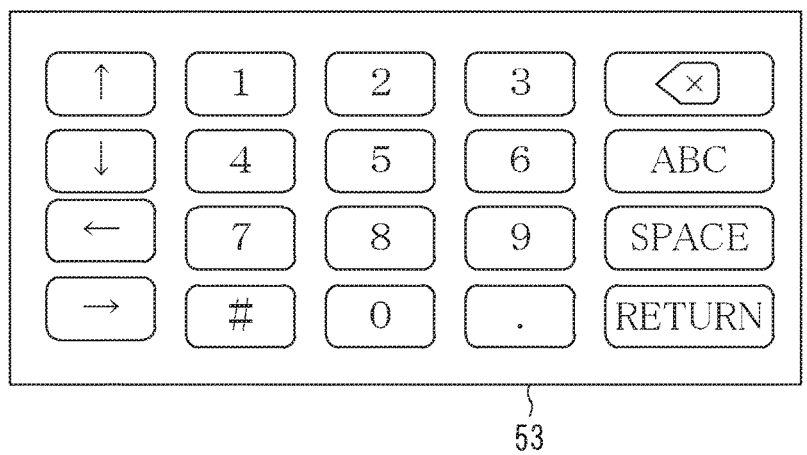
FIG. 5 is a diagram showing an example of a numeric keyboard screen.
Figure 6:
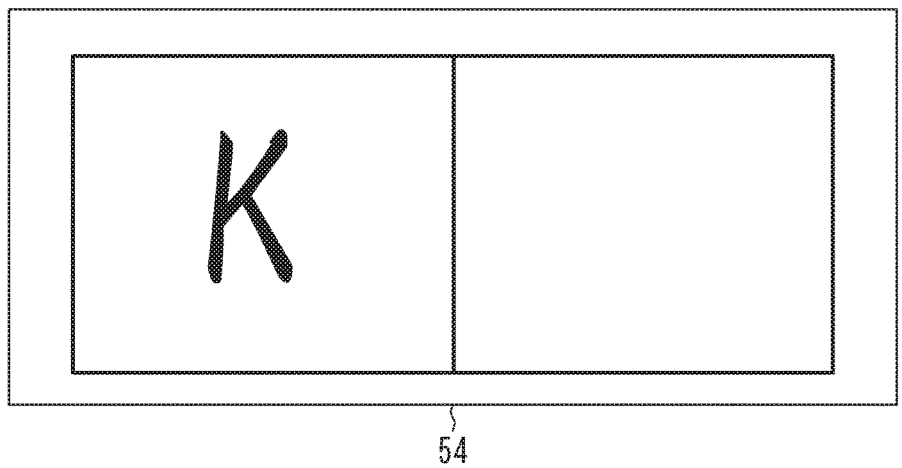
FIG. 6 is a diagram showing an example of a writing pad screen.
Figure 8:
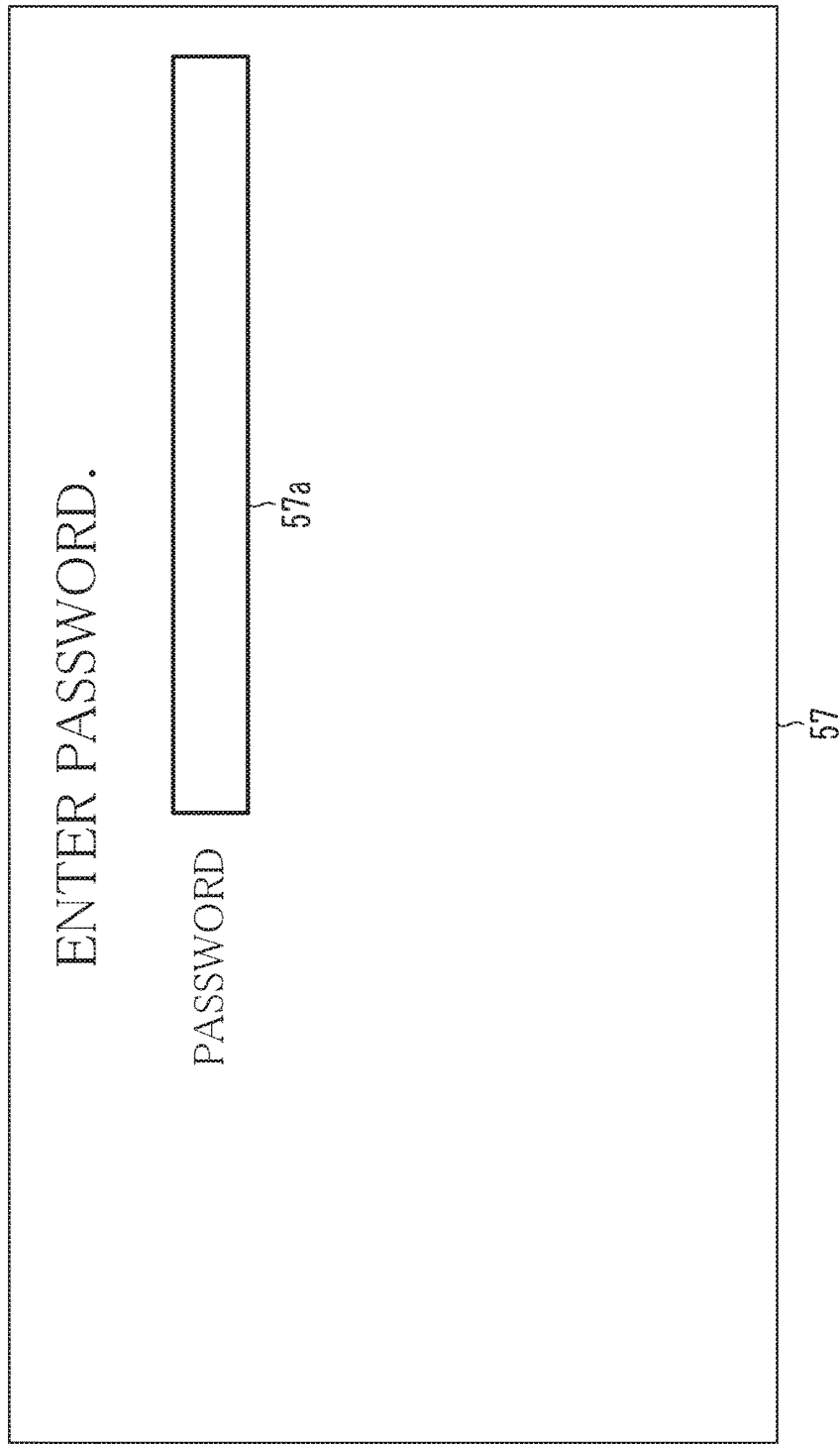
FIG. 8 is a diagram showing an example of a password entry screen.
Figure 9:
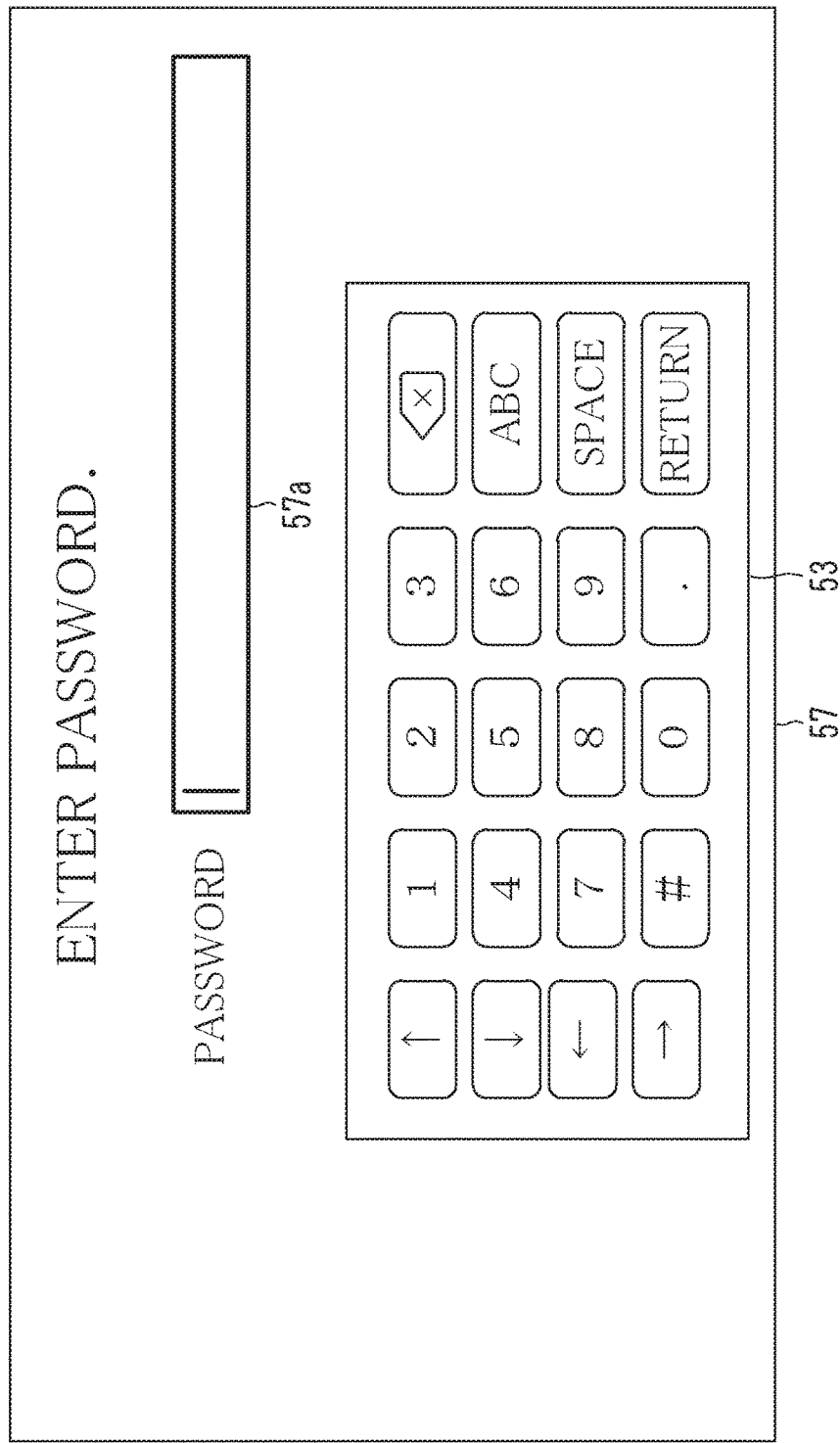
FIG. 9 is a diagram showing an example of a state where a numeric keyboard screen is displayed above a password entry screen.

FIG. 1 is a diagram showing an example of the overall configuration of a network system 4. FIG. 2 is a diagram showing an example of the hardware configuration of an image forming apparatus 1. FIG. 3 is a diagram showing an example of the functional configuration of the image forming apparatus 1. FIG. 4 is a diagram showing an example of a full keyboard screen 52. FIG. 5 is a diagram showing an example of a numeric keyboard screen 53. FIG. 6 is a diagram showing an example of a writing pad screen 54. FIG. 7 is a diagram showing an example of a screen code and an object code stored in a sensitive object storing portion 101. FIG. 8 is a diagram showing an example of a password entry screen 57. FIG. 9 is a diagram showing an example of a state where the numeric keyboard screen 53 is displayed above the password entry screen 57.

As shown in FIG. 1, the network system 4 is configured of local area networks (LANs) 4A and 4B, a communication line 4N, and so on.

The local area network 4A is configured of a plurality of image forming apparatuses 1, a plurality of terminals 2, a LAN line 31, a router 32, and so on.

The LAN line 31 is configured of a hub, a twisted pair cable, a wireless base station, and so on. Each of the image forming apparatuses 1 and each of the terminals 2 are configured to perform communication with one another via the LAN line 31.

The router 32 connects to the local area network 4B via the communication line 4N. This enables the individual devices of the local area network 4A to perform communication with the individual devices of the local area network 4B.

The image forming apparatus 1 is an image processing apparatus generally called a "multifunction device" or a "Multi-Functional Peripheral (MFP)". The image forming apparatus 1 is an apparatus into which functions such as copying, printing, scanning, faxing, and a document server function are combined.

Referring to FIG. 2, the image forming apparatus 1 is configured of a Central Processing Unit (CPU) 10a, a Dynamic Random Access Memory (D-RAM) 10b, a Static Random Access Memory (S-RAM) 10c, a Nonvolatile Random Access Memory (NV-RAM) 10d, a Read Only Memory (ROM) 10e, a hard disk 10f, a clock circuit 10g, a touch-sensitive panel display 10h, an operating key panel 10i, a Network Interface Card (NIC) 10j, a wireless LAN interface 10k, a near field wireless interface 10m, a modem 10n, a scanner unit 10p, a printing unit 10q, a microphone 10r, and so on.

The clock circuit 10g is an Integrated Circuit (IC) which measures the time to send a signal thereof to the CPU 10a.

The touch-sensitive panel display 10h displays, for example, a screen for presenting messages to a user, a screen for allowing the user to input commands or information, a screen for showing the results of processing executed by the CPU 10a, and so on. The touch-sensitive panel display 10h also sends a signal indicating a touched location to the CPU 10a.

The operating key panel 10i is a so-called hardware keyboard. The operating key panel 10i is provided with numeric keys, a start key, a stop key, and function keys such as a print key and a logout key.

The user may use the terminal 2 instead of the touch-sensitive panel display 10h to operate the image forming apparatus 1 from a remote location. This will be described later in the second embodiment. In the first embodiment, the user uses the touch-sensitive panel display 10h or the operating key panel 10i to operate the image forming apparatus 1.

The NIC 10j performs communication in accordance with a protocol such as Transmission Control Protocol/Internet Protocol (TCP/IP).

The wireless LAN interface 10k performs communication based on the standard for wireless LAN, specifically, the standard for Institute of Electrical and Electronics Engineers (IEEE) 802.11 via a base station in accordance with a protocol such as TCP/IP.

The near field wireless interface 10m performs communication based on the standard for near field communication, e.g., Bluetooth (registered trademark) or Infrared Data Association (IrDA).

The modem 10n converts image data which is a digital signal into an analog signal, and sends the analog signal to a facsimile terminal. The modem 10n also converts an analog signal sent from the facsimile terminal into image data.

The scanner unit 10p optically reads an image recorded on paper placed on a platen glass to generate image data thereof.

The printing unit 10q prints, onto paper, the image captured by the scanner unit 10p and an image represented in image data sent from other devices.

The microphone 10r picks up sound to convert the same into a signal. In the first embodiment, the microphone 10r is used, particularly, for voice input as described later.

The NV-RAM 10d, the ROM 10e, or the hard disk 10f stores, therein, programs and data for implementing the foregoing functions including the copying function. The NV-RAM 10d, the ROM 10e, or the hard disk 10f also stores, therein, a module control program 1P and a plurality of sign input modules 17 as shown in FIG. 3.

The programs and modules are loaded into the D-RAM 10b as necessary and executed by the CPU 10a. However, the module control program 1P, at least, is resident in the D-RAM 10b.

The S-RAM 10c is used as a cache memory for the case where the CPU 10a executes a program.

The terminal 2 is a client with which the print function and the scan function of the image forming apparatus 1 are used. The terminal 2 is also used as an input device in lieu of the touch-sensitive panel display 10h. The terminal 2 will be detailed in the second embodiment.

The local area network 4B is configured basically in the same manner as the local area network 4A.

The description goes on to the sign input modules 17 and the module control program 1P.

The sign input modules 17 are input portions by way of which the user enters a sign such as a letter, numeral, or mark. Examples of the sign input modules 17 include software generally called "Input Method Editor (IME)", "Input Method (IM)", or "Front-end Processor (FEP)". The sign input modules 17 are used in order that the user causes, in particular, the modem 10n, the scanner unit 10p, and the printing unit 10q to perform different processing such as copying, facsimile transmission, and scanning.

In the first embodiment, the four sign input modules 17 described below are prepared in the image forming apparatus 1.

A sound input module 171 converts a word spoken by the user into a sign based on a signal of sound picked up by the microphone 10r.

A full keyboard module 172 displays the full keyboard screen 52 as that shown in FIG. 4 on the touch-sensitive panel display 10h, receives a signal indicating a location touched by the user from the touch-sensitive panel display 10h, and converts the signal into a sign.

The full keyboard screen 52 has keys for entering alphabets, a space key, a shift key, a backspace key, a modifier key for modifying the sign type, a cursor key, a return key, and so on. The layout of alphabet keys is, for example, QWERTY. In response to the modifier key touched, the keys for entering alphabets are changed to be used for entering numerals or marks. In response to the modifier key touched again, the keys return to be used for entering alphabets.

A numeric keyboard module 173 displays the numeric keyboard screen 53 as that shown in FIG. 5 on the touch-sensitive panel display 10h, receives a signal indicating a location touched by the user from the touch-sensitive panel display 10h, and converts the signal into a sign.

The numeric keyboard screen 53 has keys for entering numerals, a space key, a cursor key, a backspace key, a modifier key for modifying the sign type, a return key, and so on. The numeric keyboard screen 53 is compatible with toggle input and flick input. To be specific, when the modifier key is touched, the keys for entering numerals are changed to be used for entering alphabets. A plurality of alphabets is assigned to one key. Alphabets are entered depending on the number of touches and the flick direction. When the modifier key is further touched, the keys for entering alphabets are changed to be used for entering Japanese syllabary characters. A plurality of Japanese syllabary characters is assigned to one key. Japanese syllabary characters are entered depending on the number of touches and the flick direction. When the modifier key is further touched, the keys return to be used for entering numerals.

A handwriting input module 174 displays the writing pad screen 54 as that shown in FIG. 6 on the touch-sensitive panel display 10h, and receives a signal indicating a location traced by the user with finger or pen from the touch-sensitive panel display 10h. The handwriting input module 174 identifies a sign represented by the traced position for sign conversion.

In the image forming apparatus 1, any one of the sound input module 171, the full keyboard module 172, the numeric keyboard module 173, and the handwriting input module 174 is preset as a default sign input module 17. Hereinafter, such a default sign input module 17 is referred to as a "default module". It is supposed that the sound input module 171 is preset as the default module in the image forming apparatus 1.

In conventional technologies, when a cursor moves to a text box on a screen so that a sign can be entered into the text box, the default module is always invoked. The user uses the default module to enter a sign. Alternatively, the user may enter the sign by performing predetermined operation to switch from the default module to another sign input module 17. The user also may enter the sign by switching again from that another sign input module 17 to the default module.

The sign input module 17 conveys data indicating the sign entered by the user to an application related to the screen, or the like.

In the first embodiment, however, when entering a sign into the text box becomes possible, the module control program 1P is executed to perform processing for changing the sign input module 17 and so on. This is to prevent leakage of sensitive (confidential) information (which needs careful handling).

The module control program 1P implements the functions of the sensitive object storing portion 101, an input module settings storing portion 102, an input information attributes determining portion 103, a suitable module determining portion 104, an input module calling portion 105, an input sign notifying portion 106, and so on, all of which are shown in FIG. 3.

In the meantime, data for a variety of screens is prepared in advance in the hard disk 10f. Each of the screens is given a unique screen code. Any of the screens is displayed on the touch-sensitive panel display 10h appropriately and selectively in accordance with operation by the user and result of processing. Each of the screens has one or more objects. Each of the objects is given a unique object code. The screen sometimes has a text box. The text box is an object by way of which information related to a specific item is entered as a sign.

As shown in FIG. 7, the sensitive object storing portion 101 stores, in advance, screen codes and object codes in association with one another on a screen-by-screen basis. The screen code is an identifier of the corresponding screen. The object code is an identifier of each sensitive object included in the corresponding screen. The "sensitive object" herein is an object by way of which sensitive information is entered.

The input module settings storing portion 102 stores, in advance, a default module identifier which is an identifier of the sign input module 17 set as the default module. In the first embodiment, the input module settings storing portion 102 stores an identifier of the sound input module 171 as the default module identifier because the sound input module 171 is the default module as described above.

The input module settings storing portion 102 further stores, in advance, a sensitive information module identifier which will be described later.

The input information attributes determining portion 103, the suitable module determining portion 104, the input module calling portion 105, and the input sign notifying portion 106 perform processing for changing the sign input module 17 when the cursor moves to a text box on a screen so that a sign can be entered into the text box.

The description goes on to processing by the input information attributes determining portion 103 through the input sign notifying portion 106 by taking an example in which the user enters a sign into a text box 57a of the password entry screen 57 shown in FIG. 8.

The password entry screen 57 is a screen on which the user enters his/her password to access a specific resource (for example, a specific file) to which access is restricted. The password entry screen 57 is displayed by using an access control program.

The input information attributes determining portion 103 determines whether or not the text box 57a corresponds to a sensitive object in the following manner. To be specific, if the sensitive object storing portion 101 stores a screen code of the password entry screen 57 and an object code of the text box 57a in association with each other, then the input information attributes determining portion 103 determines that the text box 57a corresponds to a sensitive object. Otherwise, the input information attributes determining portion 103 determines that the text box 57a does not correspond to a sensitive object.

In the case where the password entry screen 57 is obtained from another device, e.g., where the password entry screen 57 is a web page downloaded from the Internet, then the input information attributes determining portion 103 may make the determination in the following manner. The input information attributes determining portion 103 extracts, from data included in the password entry screen 57 (for example, data described in Hypertext Markup Language (HTML)), information representing attributes of the text box 57a (for example, a specific tag or text box name). If the information extracted contains a specific word/phrase which is set in advance, then the input information attributes determining portion 103 determines that the text box 57a corresponds to a sensitive object. Otherwise, the input information attributes determining portion 103 determines that the text box 57a does not correspond to a sensitive object.

The suitable module determining portion 104 determines the sign input module 17 which is suitable for entry of a sign into the text box 57a (hereinafter, such module referred to as a "suitable module") in the following manner.

If the input information attributes determining portion 103 determines that the text box 57a corresponds to a sensitive object, then the suitable module determining portion 104 determines that a sensitive information module is a suitable module.

The "sensitive information module" herein is the sign input module 17 which is most suitable for entry into the sensitive object among the sign input modules 17 (the sound input module 171, the full keyboard module 172, the numeric keyboard module 173, and the handwriting input module 174) prepared in the image forming apparatus 1.

As described above, the sensitive information module identifier is stored in advance in the input module settings storing portion 102. The "sensitive information module identifier" herein is an identifier of the sign input module 17 set as the sensitive information module.

The suitable module determining portion 104 therefore determines that the sign input module 17 identified by the sensitive information module identifier stored in the input module settings storing portion 102 is the suitable module.

In the first embodiment, it is supposed that the numeric keyboard module 173 is set as the sensitive information module. Thus, the numeric keyboard module 173 is determined to be the suitable module.

On the other hand, if the input information attributes determining portion 103 determines that the text box 57a does not correspond to a sensitive object, then the suitable module determining portion 104 determines that the default module is the suitable module. Therefore, the sound input module 171 is determined to be the suitable module.

The input module calling portion 105 calls, as the sign input module 17 used for entry of a sign into the text box 57a, the sign input module 17 determined to be the suitable module by the suitable module determining portion 104.

If the text box 57a is determined to correspond to a sensitive object, then the input module calling portion 105 calls the numeric keyboard module 173.

With the numeric keyboard module 173, the numeric keyboard screen 53 appears above the password entry screen 57 as shown in FIG. 9. The user touches keys of the numeric keyboard screen 53 to enter a sign constituting the password. In response to this operation, the numeric keyboard module 173 recognizes the sign entered by the user based on the touched location.

On the other hand, if the text box 57a is determined not to correspond to a sensitive object, then the input module calling portion 105 calls the sound input module 171. The user enters a sign constituting the password by speaking into the microphone 10r. In response to this operation, the sound input module 171 recognizes the sign entered by the user based on a signal of sound picked by the microphone 10r.

The input sign notifying portion 106 informs a program related to the password entry screen 57, namely, the access control program, of the sign recognized by any one of the sound input module 171, the full keyboard module 172, the numeric keyboard module 173, and the handwriting input module 174.

Figure 10:
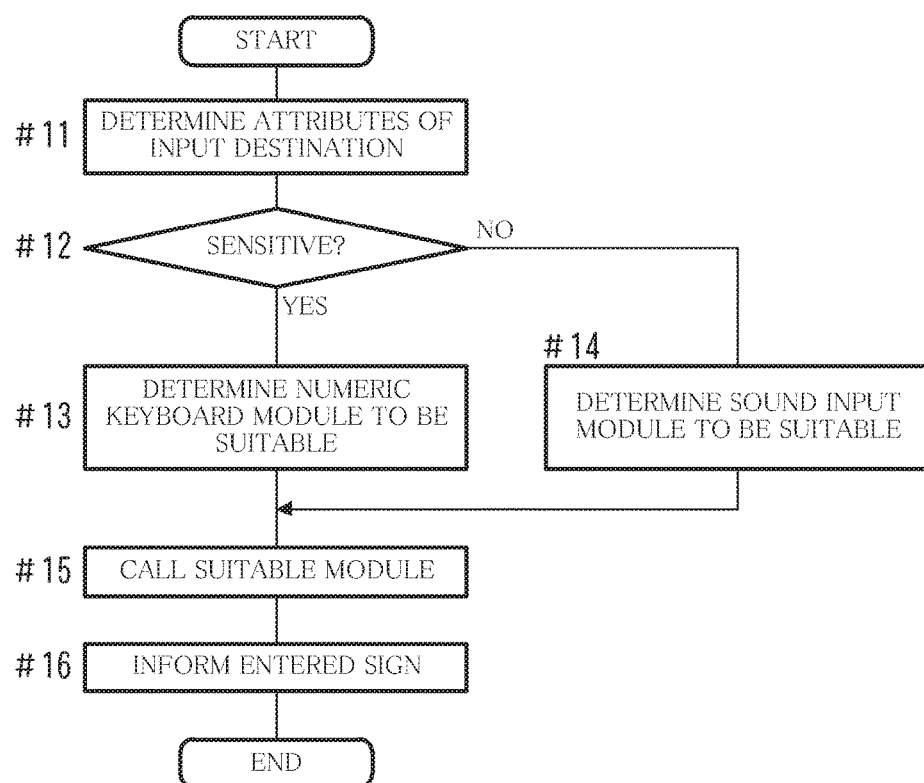
FIG. 10 is a flowchart depicting an example of the flow of the entire processing related to control by a sign input module.

FIG. 10 is a flowchart depicting an example of the flow of the entire processing related to control by the sign input module 17.

The description goes on to the flow of the entire processing, by the module control program 1P, of the image forming apparatus 1 with reference to FIG. 10.

When the cursor moves to a text box on a screen to enable entry of a sign into the text box, the image forming apparatus 1 determines whether or not the text box corresponds to a sensitive object (Step #11 of FIG. 10).

If determining that the text box corresponds to a sensitive object (YES in Step #12), then the image forming apparatus 1 determines that the sign input module 17 identified by the sensitive information module identifier is a suitable module (Step #13). As a result, the numeric keyboard module 173 is determined to be the suitable module in the first embodiment.

On the other hand, if determining that the text box does not correspond to a sensitive object (NO in Step #12), then the image forming apparatus 1 determines that the sign input module 17 identified by the default module identifier is a suitable module (Step #14). As a result, the sound input module 171 is determined to be the suitable module in the first embodiment.

The image forming apparatus 1 calls the suitable module as the sign input module 17 used for entry into the text box (Step #15). When the entry of the sign is received by using the suitable module, the image forming apparatus 1 informs an application related to the text box and so on of the entered sign (Step #16).

According to the first embodiment, it is possible to input the sensitive information with the touch-sensitive panel display 10h more securely than is conventionally possible.

[Second Embodiment]

Figure 11:
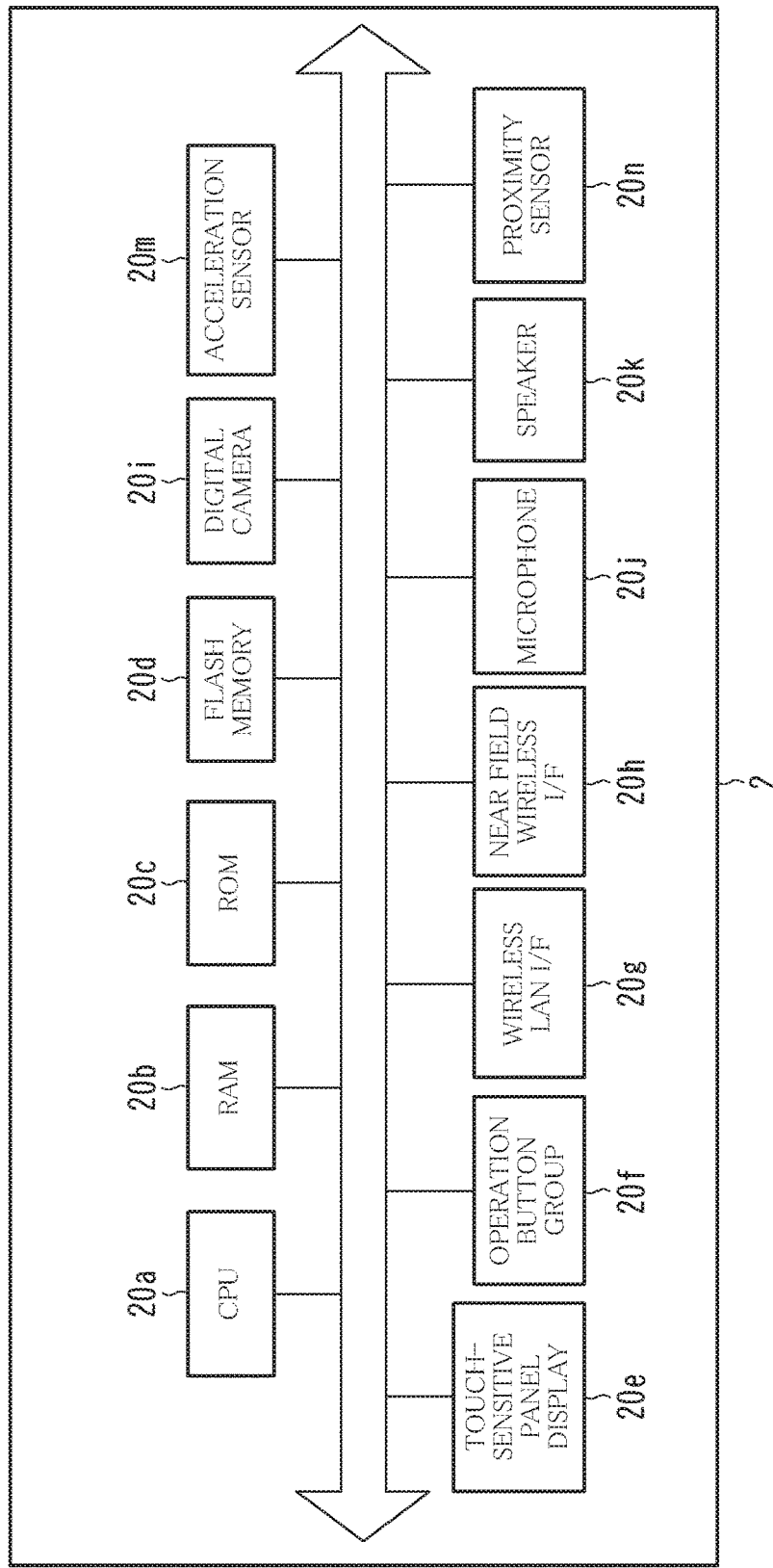
FIG. 11 is a diagram showing an example of the hardware configuration of a terminal.

FIG. 11 is a diagram showing an example of the hardware configuration of the terminal 2.

In the first embodiment, the user operates the image forming apparatus 1 with the touch-sensitive panel display 10h. In the second embodiment, the user operates the image forming apparatus 1 with the terminal 2 in lieu of the touch-sensitive panel display 10h.

Hereinafter, operation of the image forming apparatus 1 by using the terminal 2 is described. Description of points common to the first embodiment shall be omitted.

In the second embodiment, the overall configuration of the network system 4 and the hardware configuration of the image forming apparatus 1 are the same as those of the first embodiment as shown in FIGS. 1 and 2.

Examples of the terminal 2 include a tablet computer, a smartphone, and a personal computer. Hereinafter, the description is provided by taking an example in which the terminal 2 is a tablet computer.

Referring to FIG. 11, the terminal 2 is configured of a CPU 20a, a RAM 20b, a ROM 20c, a flash memory 20d, a touch-sensitive panel display 20e, an operation button group 20f, a wireless LAN interface 20g, a near field wireless interface 20h, a digital camera 20i, a microphone 20j, a speaker 20k, an acceleration sensor 20m, a proximity sensor 20n, and so on.

The touch-sensitive panel display 20e displays a variety of screens. In the second embodiment, the touch-sensitive panel display 20e displays, particularly, the same screens as those displayed on the touch-sensitive panel display 10h, or, screens similar thereto. The touch-sensitive panel display 20e detects a touched location and informs the CPU 20a of the touched location.

The operation button group 20f includes a button for returning to the start screen, a button for controlling (sound) volume, and a button for switching between ON and OFF of the power supply.

The wireless LAN interface 20g performs communication based on the standard for wireless LAN via the base station in accordance with a protocol such as TCP/IP.

The near field wireless interface 20h performs communication based on the standard for near field communication, e.g., Bluetooth or IrDA.

The wireless LAN interface 20g and the near field wireless interface 20h are used to perform communication, particularly, with the image forming apparatus 1. Either one may be used for communication with the image forming apparatus 1.

The digital camera 20i takes an image to generate image data thereof. The digital camera 20i is provided above the touch-sensitive panel display 20e. This enables the digital camera 20i to photograph the user who looks at or touch the touch-sensitive panel display 20e.

The microphone 20j picks up sound to convert the same into a signal. As with the microphone 10r, the microphone 20j is used for voice input. The speaker 20k outputs sound based on audio data.

The acceleration sensor 20m detects the posture of the terminal 2. The proximity sensor 20n detects whether the touch-sensitive panel display 20e is covered or not.

The terminal 2 is provided with a sign input module 27 which is similar to the sign input module 17 provided in the image forming apparatus 1. As the sign input module 27, there are prepared a sound input module 271, a full keyboard module 272, a numeric keyboard module 273, and a handwriting input module 274 (refer to FIG. 12). The terminal 2 has installed therein a driver for the image forming apparatus 1.

[Case of Remote Access]

In the case where the terminal 2 accesses the image forming apparatus 1 remotely, the sign input module 17 rather than the sign input module 27 is used. The module control program 1P is therefore implemented to change the sign input module 17 as with the case of the first embodiment.

To be specific, the touch-sensitive panel display 20e displays a screen which is the same as that displayed on the touch-sensitive panel display 10h, for example, the password entry screen 57 of FIG. 8.

When the user touches the touch-sensitive panel display 20e, data indicating the touched location, namely, touched location data, is sent from the terminal 2 to the image forming apparatus 1. Accordingly, when the user touches a position of a text box on the screen, touched location data indicating the position is sent to the image forming apparatus 1.

In response to this operation, a cursor moves to the text box, which enables the user to enter a sign into the text box. Then, the input information attributes determining portion 103, the suitable module determining portion 104, the input module calling portion 105, and the input sign notifying portion 106 perform the processing described in the first embodiment. The second embodiment differs from the first embodiment in the following respects.

If the suitable module determining portion 104 determines that the full keyboard module 172, the numeric keyboard module 173, or the handwriting input module 174 is a suitable module, then the full keyboard screen 52, the numeric keyboard screen 53, or the writing pad screen 54 is displayed on the touch-sensitive panel display 20e. The user touches the touch-sensitive panel display 20e to enter a sign.

The suitable module thus determined recognizes the sign entered by the user based on the touched location data sent from the terminal 2.

On the other hand, if the suitable module determining portion 104 determines that the sound input module 171 is a suitable module, then the user enters a sign by speaking into the microphone 20j. The microphone 20j picks up the user voice to convert the same into audio data, and sends the audio data to the image forming apparatus 1.

The sound input module 171 recognizes the sign entered by the user based on the audio data sent from the terminal 2.

[Case of the Use of Web Server Function, etc.]

Figure 12:
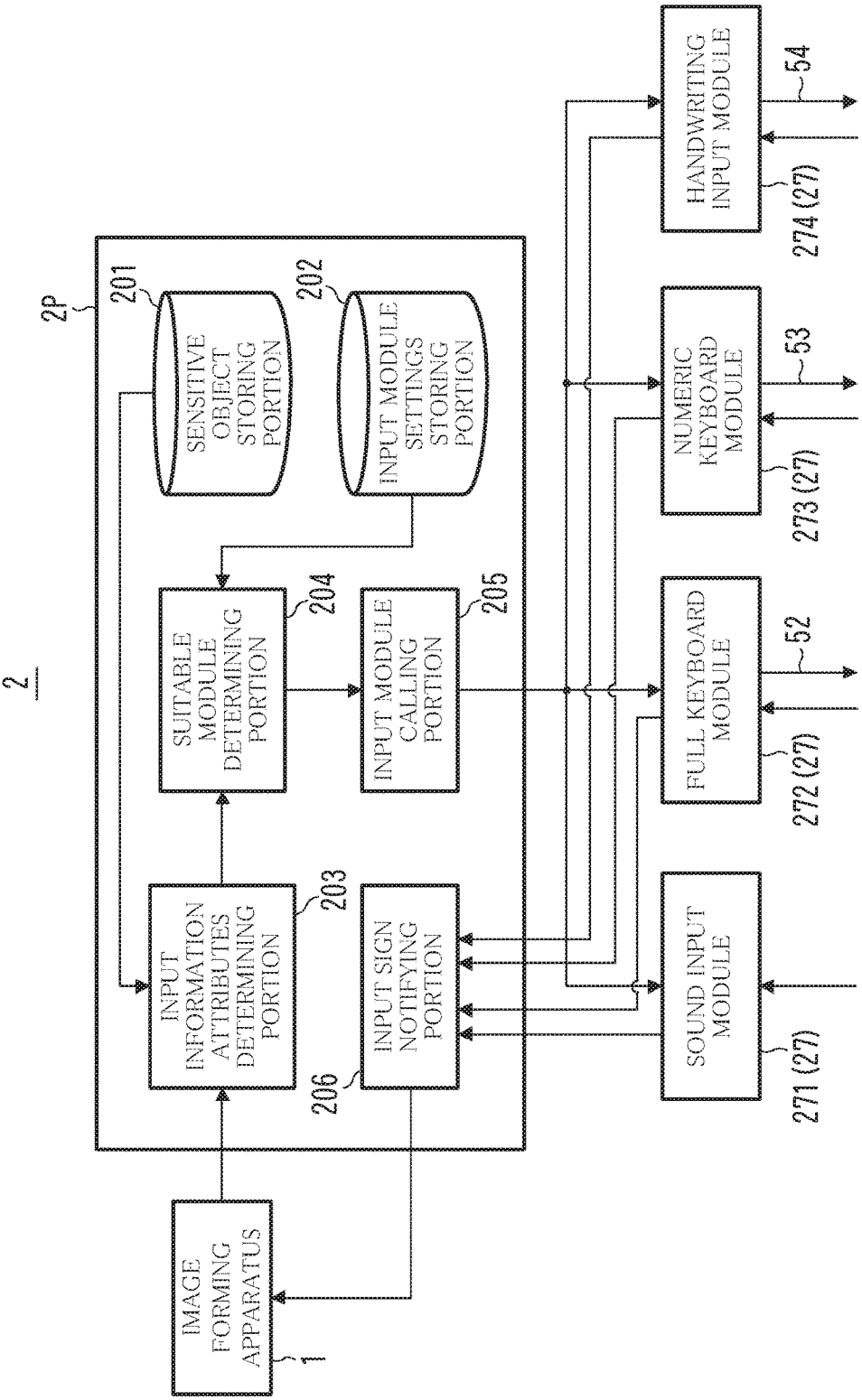
FIG. 12 is a diagram showing an example of the functional configuration of a terminal.

FIG. 12 is a diagram showing an example of the functional configuration of the terminal 2.

A screen imitating the screen displayed in the image forming apparatus 1 may be prepared with description in HTML and be displayed on the terminal 2. Hereinafter, the screen thus prepared is referred to as a "pseudo screen". Any one of the sound input module 271, the full keyboard module 272, the numeric keyboard module 273, and the handwriting input module 274 may be used to receive a sign entered into a text box on the pseudo screen and to send data of the sign to the image forming apparatus 1. The web server function can be used to provide the terminal 2 with the pseudo screen and receive the data on the sign from the terminal 2.

The ROM 20c or the flash memory 20d of the terminal 2 is caused to store therein a module control program 2P in advance. The module control program 2P is loaded into the RAM 20b and executed by the CPU 20a.

The module control program 2P implements the functions of a sensitive object storing portion 201, an input module settings storing portion 202, an input information attributes determination portion 203, a suitable module determination portion 204, an input module calling portion 205, an input sign notifying portion 206, and so on, all of which are shown in FIG. 12.

The functions of the sensitive object storing portion 201 and the input module settings storing portion 202 are basically the same as those of the sensitive object storing portion 101 and the input module settings storing portion 102 (refer to FIG. 3) of the first embodiment, respectively.

Note that the sensitive object storing portion 201 stores screen codes and object codes in association with one another on a pseudo screen-by-pseudo screen basis. The screen code is an identifier of the corresponding pseudo screen. The object code is an identifier of each sensitive object included in the corresponding pseudo screen.

The input module settings storing portion 202 stores, in advance, an identifier of the sign input module 27 set as the default module, i.e., a default module identifier, and an identifier of the sign input module 27 set as the sensitive information module, i.e., a sensitive information module identifier.

As with the first embodiment, it is desirable, also in the second embodiment, that the handwriting input module 274 is set as the default module and the numeric keyboard module 273 is set as the sensitive information module.

The input information attributes determination portion 203, the suitable module determination portion 204, and the input module calling portion 205 perform processing for changing the sign input module 27 when the cursor moves to any of the text boxes on the pseudo screen so that a sign can be entered into the text box. The details of the processing are basically the same as those by the input information attributes determining portion 103, the suitable module determining portion 104, and the input module calling portion 105 of the first embodiment.

The input information attributes determination portion 203, however, determines whether or not the text box corresponds to a sensitive object based on whether or not the sensitive object storing portion 201 stores a screen code of the pseudo screen and an object code of the text box in association with each other. If the screen code of the pseudo screen is associated with the object code of the text box, then the input information attributes determination portion 203 determines that text box corresponds to a sensitive object. Otherwise, the input information attributes determination portion 203 determines that text box does not correspond to a sensitive object. Alternatively, the determination may be made based on information representing attributes of the text box as with the case of the first embodiment.

The suitable module determination portion 204 determines the sign input module 27 (suitable module) which is suitable for entry of a sign into the text box based on the result of determination by the input information attributes determination portion 203 and the sensitive information module identifier stored in the sensitive object storing portion 201.

The input module calling portion 205 calls, as the sign input module 27 used for entry of a sign into the text box, the sign input module 27 determined to be the suitable module by the suitable module determination portion 204.

The user enters a sign into the terminal 2 by touching the touch-sensitive panel display 20e, or, by speaking into the microphone 20j. In response to the operation, the suitable module (the sound input module 271, the full keyboard module 272, the numeric keyboard module 273, or the handwriting input module 274) recognizes the sign entered by the user in a manner similar to that by the sound input module 171, the full keyboard module 172, the numeric keyboard module 173, or the handwriting input module 174.

The input sign notifying portion 206 sends, to the image forming apparatus 1, data indicating the sign recognized by the suitable module.

Figure 13:
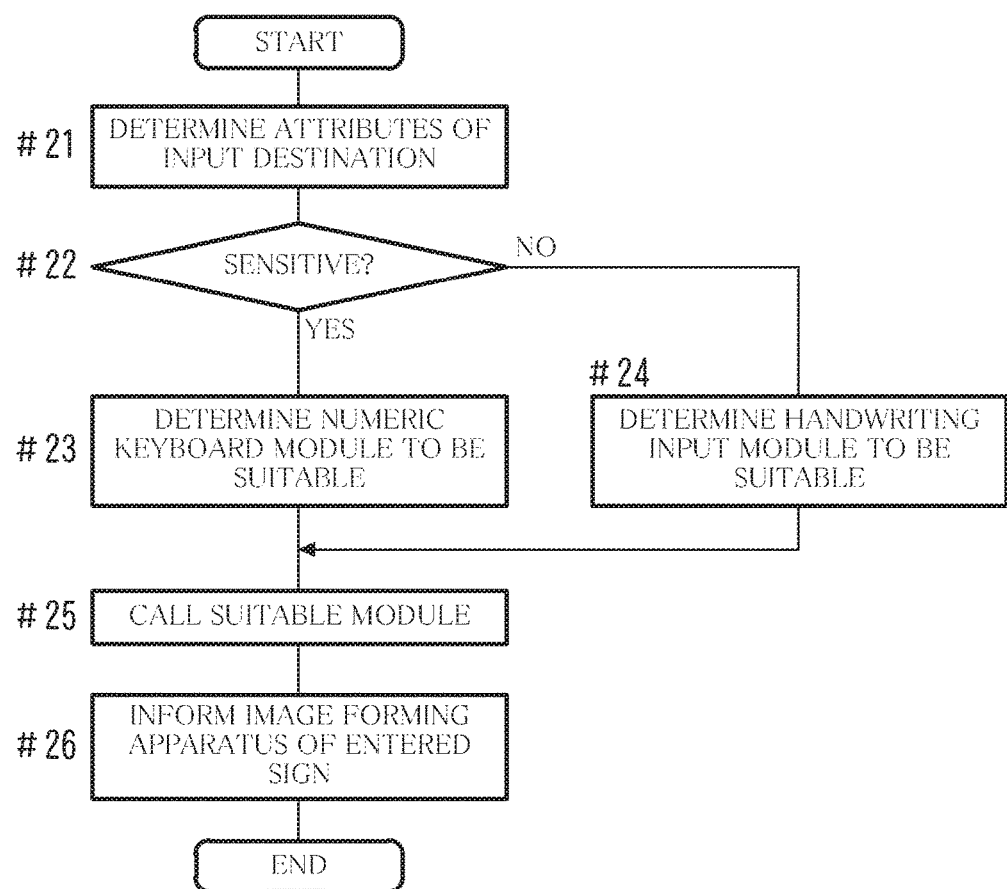
FIG. 13 is a flowchart depicting an example of the flow of the entire processing related to control by a sign input module.

FIG. 13 is a flowchart depicting an example of the flow of the entire processing related to control by the sign input module 27.

The description goes on to the flow of the entire processing, by the module control program 2P, of the terminal 2 with reference to FIG. 13.

When the cursor moves to a text box on a pseudo screen to enable entry of a sign into the text box, the terminal 2 determines whether or not the text box corresponds to a sensitive object (Step #21 of FIG. 13).

If determining that the text box corresponds to a sensitive object (YES in Step #22), then the terminal 2 determines that the sign input module 27 identified by the sensitive information module identifier is a suitable module (Step #23).

On the other hand, if determining that the text box does not correspond to a sensitive object (NO in Step #22), then the terminal 2 determines that the sign input module 27 identified by the default module identifier is a suitable module (Step #24).

The terminal 2 calls the suitable module as the sign input module 27 used for entry into the text box (Step #25). When the entry of the sign is received by using the suitable module, the terminal 2 informs the image forming apparatus 1 of the entered sign (Step #26).

According to the second embodiment, it is possible to input the sensitive information with the touch-sensitive panel display 20e more securely than is conventionally possible.

As discussed above, according to the first and second embodiments, it is possible to input sensitive information more securely than is conventionally possible.

Figure 15:
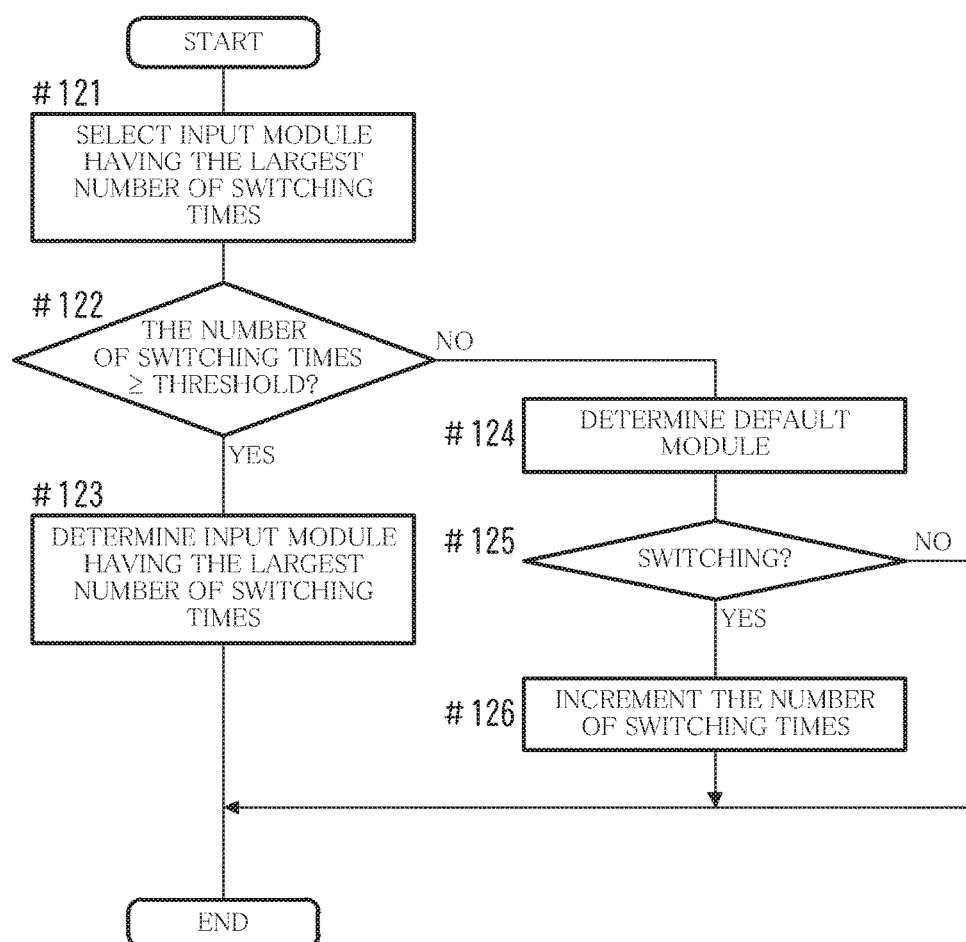
FIG. 15 is a flowchart depicting a modification of the flow of the entire processing related to control by a sign input module.
Figure 16A:
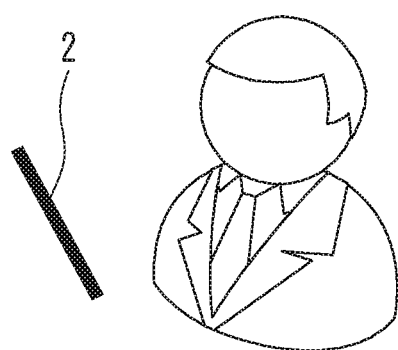
FIGS. 16A and 16B are diagrams showing examples of a positional relationship between a user and a terminal.
Figure 16B:
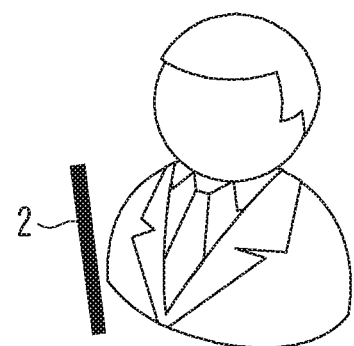

FIG. 14 is a diagram showing an example of a table in which the number of switching times is stored for each text box. FIG. 15 is a flowchart depicting a modification of the flow of the entire processing related to control by the sign input module 17. FIGS. 16A and 16B are diagrams showing examples of a positional relationship between a user and the terminal 2.

The case is described in which examples of the sensitive information module are the numeric keyboard module 173 and the numeric keyboard module 273 in the first and second embodiments, respectively. Instead of this, however, the sensitive information module may be the full keyboard module 172 and the full keyboard module 272 in the first and second embodiments, respectively. Further, the first embodiment takes the example in which the default module is the sound input module 171. Instead of this, however, the default module may be the handwriting input module 174. The second embodiment takes the example in which the default module is the handwriting input module 274. Instead of this, however, the default module may be the sound input module 271.

In the case where the terminal 2 is provided with a module with which a sign is entered based on the direction of line-of-sight of the user, the module may be used as the sensitive information module. The line-of-sight of the user can be detected by the digital camera 20i to take an image of his/her eyes. Likewise, the image forming apparatus 1 may be provided with a digital camera and this type of module, so that the module may be used as the sensitive information module. As with the digital camera 20i of the terminal 2, the digital camera is preferably positioned above the touch-sensitive panel display 10h. The same applies to the descriptions hereinafter.

In the case where the terminal 2 is provided with a module with which a sign is entered based on the movement and shape of the lip of the user, the module may be used as the sensitive information module. The digital camera 20*i* is used to take an image of the lip. Likewise, the image forming apparatus 1 may be provided with a digital camera and this type of module, so that the module may be used as the sensitive information module.

In this description, a password is taken as an example of the sensitive information. Information other than the password may be used as the sensitive information. For example, the sensitive information may be: a file name of a new file saved to a predetermined storage area (directory, folder, or box) of the image forming apparatus 1; a new file name of a file already saved thereto; a user code and password used for log-in operation; and personal information such as address, telephone number, and credit card number. When the user enters these pieces of information, the sensitive information module is preferably used.

In the foregoing embodiments, the suitable module determining portion 104 determines a suitable module for a text box into which a sign can be entered based on the result of determination by the input information attributes determining portion 103. The determination method is not limited thereto. The method described below may be used for the determination.

Referring to FIG. 14, for each text box, records are made of the number of times of switching from the default module to each of the sound input module 171, the full keyboard module 172, the numeric keyboard module 173, and the handwriting input module 174 when a sign can be entered into the corresponding text box. The number of such times is hereinafter referred to as a "number of switching times". The recording medium, e.g., the hard disk 10*f*, is caused to store the number of switching times. It is supposed that, in this example, the handwriting input module 174 is set as the default module.

The suitable module determining portion 104 executes processing according to the steps as shown in FIG. 15. When entering a sign into a text box becomes possible, the suitable module determining portion 104 selects a sign input module 17 having the largest number of switching times of the text box (Step #121). For example, if the screen code of the text box is "G001" and the object code is "B004", then the full keyboard module 172 is selected.

If the number of switching times is equal to or greater than a predetermined number of times (YES in Step #122), then the suitable module determining portion 104 determines that the sign input module 17 selected (the full keyboard module 172 in this example) is a suitable module (Step #123). Otherwise (NO in Step #122), the suitable module determining portion 104 determines that the default module (the handwriting input module 174 in this example) is a suitable module (Step #124).

At the time of entry into the text box, if the default module is changed to another sign input module 17 (YES in Step #125), then the suitable module determining portion 104 adds "1" to the number of switching times of that another sign input module 17 (post-change input module) corresponding to the text box (Step #126).

This method enables determination, based on the actual record of the change by the user, as to whether or not information to be entered into the text box is sensitive information.

This method is also applicable to the suitable module determination portion 204. However, the image forming apparatus 1 may centrally manage the number of switching times. In such a case, the suitable module determination portion 204 obtains, prior to the processing in Step #121, data indicating the number of switching times from the image forming apparatus 1. Further, in lieu of the processing in Step #126, data indicating the text box and the post-change sign input module 17 is sent to the image forming apparatus 1. The image forming apparatus 1 adds, based on the received data, "1" to the number of switching times of the post-change sign input module 17 corresponding to the text box.

In the foregoing embodiments, the input information attributes determination portion 203 determines whether or not a text box corresponds to a sensitive object based on the data stored in the sensitive object storing portion 201. The determination method is not limited thereto. Another method may be used for the determination.

In a state where a sign can be entered into a text box, if the angle of the display surface of the touch-sensitive panel display 20*e* with respect to the ground (horizontal plane) is smaller than a predetermined angle as shown in FIG. 16A, then the input information attributes determination portion 203 determines that the text box does not correspond to a sensitive object. The acceleration sensor 20*m* may be used to measure the angle. In contrast, if the angle of the display surface of the touch-sensitive panel display 20*e* with respect to the ground is greater than the predetermined angle as shown in FIG. 16B, then the input information attributes determination portion 203 determines that the text box corresponds to a sensitive object. The method may be used also in the image forming apparatus 1, provided that the angle of the display surface of the touch-sensitive panel display 10*h* is adjustable.

Alternatively, in a state where a sign can be entered into a text box, if the distance between the user and the terminal 2 is equal to or greater than a predetermined distance as shown in FIG. 16A, then the input information attributes determination portion 203 determines that the text box does not correspond to a sensitive object. The distance is preferably determined based on the size of user face or the size of a part thereof (eyes, for example) photographed by the digital camera 20*i*. Alternatively, the input information attributes determination portion 203 may determine that the distance is equal to or greater than the predetermined distance if the proximity sensor 20*n* detects no objects. Yet alternatively, the input information attributes determination portion 203 may determine that the text box does not correspond to a sensitive object if the digital camera 20*i* takes an image of the entirety of the face or a specific part (eyes, for example) thereof. In contrast, if the distance between the user and the terminal 2 is smaller than the predetermined distance as shown in FIG. 16B, then the input information attributes determination portion 203 determines that the text box corresponds to a sensitive object. Alternatively, the input information attributes determination portion 203 may determine that the distance is smaller than the predetermined distance if the proximity sensor 20*n* detects an object. Yet alternatively, the input information attributes determination portion 203 may determine that the text box corresponds to a sensitive object if the digital camera 20*i* does not take any images of the face or does not take a specific part (eyes, for example) thereof.

Another configuration is also possible in which data obtained by the acceleration sensor 20*m*, the digital camera 20*i*, or the proximity sensor 20*n* is sent to the image forming apparatus 1, and the input information attributes determining portion 103 applies the foregoing method to determine whether or not the text box corresponds to a sensitive object.

In the case of calling the handwriting input module 174 as the sensitive information module, restriction may be applied in a manner to use only any one of the toggle input and the flick input.

It is to be understood that the configurations of the network system 4, the image forming apparatus 1, the terminal 2, the constituent elements thereof, the content and order of the processing, the configuration of the data, the configuration of the screens, and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An information processing apparatus comprising:
   a display displaying a screen for receiving information input from a user;
   a first input portion entering information into the screen;
   a second input portion entering information into the screen in a manner different from that of the first input portion;
   a setting portion setting an input mode by the first input portion; and
   a control portion switching from the first input portion to the second input portion when the input mode by the first input portion is set and a screen for receiving input of sensitive information is displayed.

2. The information processing apparatus according to claim 1, comprising
   a printer configured to print an image onto paper, and
   a reading portion configured to read an image from paper;
   wherein
   the first input mode and the second input mode are used to operate the printer or the reading portion.

3. The information processing apparatus according to claim 1, wherein the first input mode and the second input mode are used to operate an image forming apparatus.

4. The information processing apparatus according to claim 1, wherein
   the first input mode obtains the information by using a microphone to pick up a sound and processing the sound, and
   the second input mode displays an on-screen keyboard on a touch-sensitive panel display, detects a position touched on the on-screen keyboard, and obtains the information based on the position touched, or, alternatively, the second input mode uses a digital camera to take an image of an eye of the user, detects a line-of-sight, and obtains the information based on the line-of-sight.

5. The information processing apparatus according to claim 1, wherein
   the first input mode obtains the information based on a position traced on a touch-sensitive panel display, and
   the second input mode displays an on-screen keyboard on the touch-sensitive panel display, detects a position touched on the on-screen keyboard, and obtains the information based on the position touched, or, alternatively, the second input mode uses a digital camera to take an image of an eye of the user, detects a line-of-sight, and obtains the information based on the line-of-sight.

6. The information processing apparatus according to claim 1, wherein the module control determination program determines whether or not the entry target information is sensitive based on a text box into which the entry target information is to be entered.

7. The information processing apparatus according to claim 1, wherein the module control determination program determines whether or not the entry target information is sensitive based on a posture of the information processing apparatus which is ready to receive an entry of the entry target information.

8. The information processing apparatus according to claim 1, wherein the module control determination program determines whether or not the entry target information is sensitive based on a distance between the user and the information processing apparatus which is ready to receive an entry of the entry target information.

9. The information processing apparatus according to claim 1, wherein the first input portion serves to enter information via voice or handwriting.

10. The information processing apparatus according to claim 1, wherein the second input portion is a keyboard.

11. An information processing apparatus comprising:
    a display displaying a screen for receiving information input from a user;
    a first input portion entering information into the screen;
    a second input portion entering information into the screen in a manner different from that of the first input portion;
    a setting portion setting an input mode by the first input portion;
    a counter counting the number of switching times from the first input portion to the second input portion; and
    a control portion switching from the first input portion to the second input portion when the input mode by the first input portion is set and the number of switching times by the counter is equal to or greater than a predetermined number of times.

12. The information processing apparatus according to claim 11, wherein the first input portion serves to enter information via voice or handwriting.

13. The information processing apparatus according to claim 11, wherein the second input portion is a keyboard.

14. The information processing apparatus according to claim 11, wherein the control portion determines whether or not the number of switching times currently displayed in the display is equal to or greater than the predetermined number of times based on an actual past record by the counter counting the number of switching times from the first input portion to the second input portion.

15. A method comprising:
    displaying a screen for receiving information input from a user;
    entering information into the screen using a first input portion;
    entering, in a manner different from that of the first input portion, information into the screen using a second input portion;
    setting an input mode by the first input portion;
    switching from the first input portion to the second input portion when the input mode by the first input portion is set, and a screen for receiving input of sensitive information is displayed.

16. A non-transitory computer-readable storage medium storing thereon a computer program which causes the information processing apparatus to perform the method for calling an input portion according to claim 15.

17. A method comprising:
  displaying a screen for receiving information input from a user;
  entering information into the screen using a first input portion;
  entering, in a manner different from that of the first input portion, information into the screen using a second input portion;
  setting an input mode by the first input portion;
  counting the number of switching times from the first input portion to the second input portion; and
  switching from the first input portion to the second input portion when the input mode by the first input portion is set, and the number of switching times by the counter is equal to or greater than a predetermined number of times.

18. A non-transitory computer-readable storage medium storing thereon a computer program which causes the information processing apparatus to perform the method for calling any one of the first input mode and the second input mode according to claim 17.

* * * * *